(12) United States Patent
Kirihata et al.

(10) Patent No.: US 11,329,836 B1
(45) Date of Patent: May 10, 2022

(54) TWIN CELL MEMORY-BASED PHYSICALLY UNCLONABLE FUNCTION

(71) Applicant: GLOBALFOUNDRIES U.S. Inc., Malta, NY (US)

(72) Inventors: Toshiaki Kirihata, Poughkeepsie, NY (US); Balaji Jayaraman, Bangalore (IN); Chandrahasa Reddy Dinnipati, Andhra Pradesh (IN); Ramesh Raghavan, Hyderabad (IN)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/199,515

(22) Filed: Mar. 12, 2021

(51) Int. Cl.
*H04L 9/32* (2006.01)
*G11C 7/06* (2006.01)
*G11C 8/10* (2006.01)

(52) U.S. Cl.
CPC .............. *H04L 9/3278* (2013.01); *G11C 7/06* (2013.01); *G11C 8/10* (2013.01)

(58) Field of Classification Search
CPC ............ H04L 9/3278; G11C 7/06; G11C 8/10
See application file for complete search history.

(56) References Cited

U.S. PATENT DOCUMENTS

| | | | |
|---|---|---|---|
| 8,741,713 B2 | 6/2014 | Bruley et al. | |
| 9,436,845 B2 | 9/2016 | Iyer et al. | |
| 9,497,027 B2 * | 11/2016 | Chen | ....................... G11C 17/16 |
| 9,576,914 B2 | 2/2017 | Li et al. | |
| 9,613,714 B1 * | 4/2017 | Wong | ...................... G11C 17/18 |
| 9,640,228 B2 | 5/2017 | Ioannou et al. | |
| 10,468,104 B1 | 11/2019 | Anand et al. | |
| 10,714,199 B1 * | 7/2020 | Bill | ........................ G11C 16/349 |
| 11,056,161 B2 * | 7/2021 | Mahatme | .................. G11C 7/24 |
| 2011/0317829 A1 | 12/2011 | Ficke et al. | |
| 2018/0191512 A1 | 7/2018 | Tomishima | |

OTHER PUBLICATIONS

Suresh et al., "A 0.26% BER, 1028 Challenge-Response Machine-Learning Resistant Strang-PUF in 14nm CMOS Featuring Stability-Aware Adversarial Challenge Selection", IEEE, 2020, pp. 1-2.
McGrath et al., "A PUF Taxonomy", Applied Physics Reviews, vol. 6, 011303, 2019, pp. 1-26.

* cited by examiner

*Primary Examiner* — Ajay Ojha
(74) *Attorney, Agent, or Firm* — Gibb & Riley, LLC; David A. Cain, Esq.

(57) ABSTRACT

A Physically Unclonable Function (PUF) structure includes an array of twin cells divided into two portions: one with first columns and one with second columns. Cells in each first column are connected to a corresponding pair of first bitlines. Cells in each second column are connected to a corresponding pair of second bitlines. A first column decoder is connected to the first bitlines and to a first input of sense amplifier (SA) and a second column decoder is connected to the second bitlines and to a second input of SA. Each read operation to generate a bit is directed to a first cell in a first column and a second cell in a second column and, during the read operation, signals on only one first bitline of the first column containing the first cell and only one second bitline of the second column containing the second cell are compared.

20 Claims, 5 Drawing Sheets

TWIN CELL MEMORY-BASED PHYSICALLY UNCLONABLE FUNCTION

BACKGROUND

Field of the Invention

The present invention relates to physically unclonable functions (PUFs) and, more particularly, to embodiments of a twin cell memory-based PUF structure and method.

Description of Related Art

With the ever-increasing use of Internet of Things (IoT) objects, wireless communications and data are becoming more and more vulnerable to a wide range of security threats. To protect against such security threats, Physically Unclonable Functions (PUFs) have been developed for cryptography (e.g., encryption and decryption), advanced authentication, etc. Generally, a PUF is an on-chip random number generator. Ideally, a PUF will consistently generate and output the exact same valid response and, particularly, the exact same random number (i.e., the exact same randomly generated bitstring) whenever a valid challenge is received. A challenge-response pair (CRP) refers to a valid challenge and the valid response to that challenge. A weak PUF refers to a PUF that supports a small number of challenge-response pairs (CRPs) (e.g., one or two CRPs). A strong PUF refers to a PUF that supports a large number of CRPs (e.g., more than two CRPs). Typically, a strong PUF incorporates multiple instances of weak PUF on the same chip in order to support the large number of CRPs and, thus, consumes significantly more chip area than a single weak PUF.

SUMMARY

Generally, disclosed herein are embodiments of a Physically Unclonable Function (PUF) structure, particularly, a strong twin cell memory-based PUF structure. The PUF structure can include an array of twin cells arranged in rows and columns. As discussed further in the detailed description section, a twin cell refers to a memory cell with two sections, which are electrically connected and have the same design. In some embodiments, each twin cell can include two n-type field effect transistors (NFETs) connected in series. In any case, the array of twin cells can be divided into two portions: a first portion with first columns and a second portion with second columns. The PUF structure can further include first bitlines for the first columns and second bitlines for the second columns. All cells in each first column can be connected to a corresponding pair of the first bitlines and all cells in each second column can be connected to a corresponding pair of the second bitlines. The PUF structure can further include: a sense amplifier; a first column decoder, which is connected to each of the first bitlines and to a first input of the sense amplifier and which is configured to selectively connect any one of the first bitlines to the first input; and a second column decoder, which is connected to each of the second bitlines and to a second input of the sense amplifier and which is configured to selectively connect any one of the second bitlines to the second input.

Such a PUF structure can generate a response to a challenge and, more specifically, can, in response to a challenge, perform read operations in a particular sequence so as to output bits in a unique bitstring. However, each read operation is not directed to an individual twin cell (as in prior art PUF structures). Instead, each read operation is directed to multiple twin cells, including at least one twin cell in a first column and at least one twin cell in a second column. Furthermore, each read operation is only directed to one section of each of the multiple twin cells. Specifically, during a read operation directed to selected twin cell(s) in a specific first column and selected twin cell(s) in a specific second column, the first column decoder selectively connects only one specific first bitline of the pair of first bitlines for the specific first column to the first input of the sense amplifier and the second column decoder selectively connects only one specific second bitline of the pair of second bitlines for the specific second column to the second input of the sense amplifier. The sense amplifier then senses a voltage differential between the specific first bitline and the specific second bitline and this voltage differential is indicative of a randomly stored bit. Thus, different sections of different twin cells, in combination, effectively form a bitcell that is read out during the read operation. By enabling bitcells to be formed using different combinations of different sections of different twin cells, the PUF structure can support multiple challenge-response pairs (CRPs) as opposed to a single CRP.

The different PUF structure embodiments disclosed herein and discussed further in the detailed description section are configured to support different numbers of CRPs using the same numbers of twin cells within an array.

Also disclosed herein are associated method embodiments for operating a Physically Unclonable function (PUF) structure. Specifically, the method embodiments can include providing a PUF structure, as described above. The method embodiments can further include receiving, by the PUF structure, a challenge and generating, by the PUF structure, a response to that challenge. The process of generating the response to the challenge can include performing read operations in a particular sequence to output bits in a unique bitstring. However, each read operation that results in the generation of a bit is not directed to an individual twin cell (as in prior art methods). Instead, each read operation that results in the generation of a bit is directed to multiple twin cells, including at least one twin cell in a first column within the array and at least one twin cell in a second column within the array, and is further only directed to one section of each of those twin cells. Specifically, the method embodiments include, during a read operation directed to selected twin cell(s) in a specific first column and selected twin cell(s) in a specific second column, selectively connecting, by the first column decoder, a specific first bitline of the pair of first bitlines for the specific first column to the first input of the sense amplifier; selectively connecting a specific second bitline of the pair of second bitlines for the specific second column to the second input of the sense amplifier; and then sensing, by the sense amplifier, a voltage differential between the specific first bitline and the specific second bitline, wherein the voltage differential is indicative of a randomly stored bit. Thus, different sections of different twin cells, in combination, effectively form the bitcell that is read out during the read operation.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, with the ever-increasing use of Internet of Things (IoT) objects, wireless communications and data are becoming more and more vulnerable to a wide range of security threats. To protect against such security threats, Physically Unclonable Functions (PUFs) have been developed for cryptography (e.g., encryption and decryption), advanced authentication, etc. Generally, a PUF is an on-chip random number generator. Ideally, a PUF will consistently generate and output the exact same valid response and, particularly, the exact same random number (i.e., the exact same randomly generated bitstring) whenever a valid challenge is received. A challenge-response pair (CRP) refers to a valid challenge and the valid response to that challenge.

Figure 1:
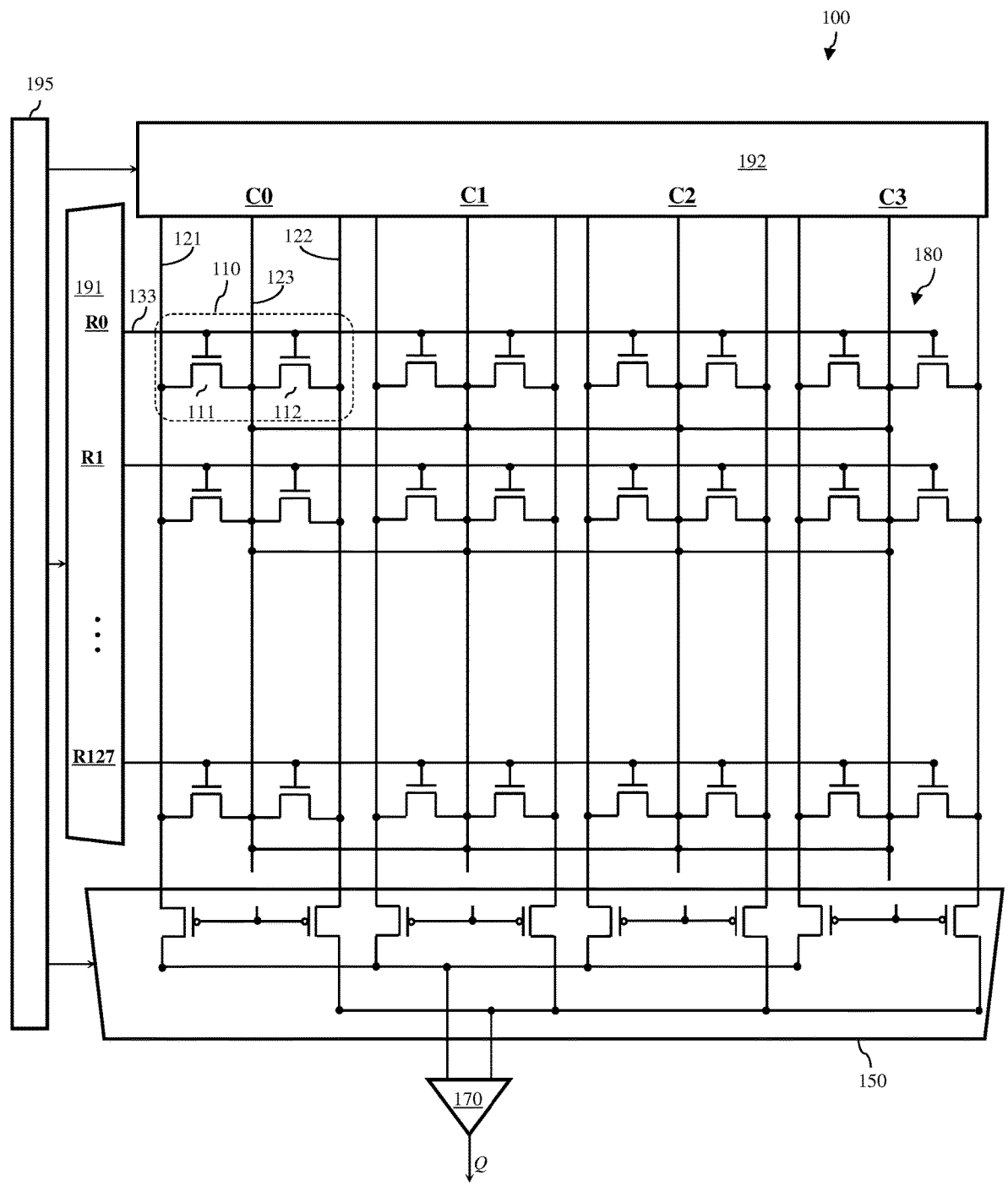
FIG. 1 is a circuit diagram illustrating a conventional twin cell memory-based Physically Unclonable Function (PUF)

FIG. 1 is a circuit diagram illustrating the exemplary architecture of a conventional twin cell memory-based PUF structure 100. This PUF structure 100 includes an array 180 of twin cells 110 arranged in columns (e.g., see columns C0-C3) and rows (e.g., see rows R0-R127). A twin cell refers to a memory cell with two sections, which are electrically connected and have the same design (i.e., are "twins"). In this exemplary architecture, each twin cell 110 includes two n-type field effect transistors (NFETs) 111-112 connected in series. The NFETs 111-112 of each twin cell 110 within a column are electrically connected in series between a pair of bitlines 121-122 for that column and the junction between the NFETs 111-112 is electrically connected to a source line 123 for the column. Additionally, the gates of NFETs 111-112 of each twin cell 110 in a row are electrically connected to the wordline 133 for that row. The PUF structure 100 can further include a sense amplifier 170, a controller 195 and, in communication with the controller 195, a pre-charge circuit 192, a row decoder 191 and a column decoder 150. The pre-charge circuit 192 can be electrically connected to the source lines for the columns and can be configured to pre-charge the source lines prior to read operations. The row decoder 191 can be electrically connected to the wordlines for the rows, can include, for example, row address decode logic and drivers, and can be configured to selectively activate (e.g., drive to VDD) one specific wordline for one specific row in response to a specific row address signal received from the controller 195. The column decoder 150 can include column address decode logic and a multiplexor, which is connected to each of the pairs of bitlines for each of the columns, respectively (e.g., to bitlines 121-122 of C0, to bitlines 121-122 of C1, and so on) and to each a pair of inputs to the sense amplifier 170, and can be configured to selectively connect one specific pair of bitlines for one specific column to the pair of inputs of the sense amplifier 170 in response to a specific column address signal received from the controller 195.

With such a PUF structure 100, each twin cell 110 can randomly store a bit with a logic value of "0" or "1". Specifically, due to random process variations that occur naturally during manufacturing (e.g., variations in channel length and width, dopant concentration fluctuations in the channel, differences in the amount of charge stored in the gate dielectric, etc.), the NFETs 111-112 within each twin cell 110 can have different threshold voltages (VTs). Prior to a read operation of a specific twin cell at a specific column and a specific row, the source line 123 for the specific column is pre-charged by the pre-charge circuit 192. During the read operation, the bitlines for the specific column are selectively connected to the inputs of the sense amplifier 170 by the column decoder 150. The specific wordline 133 for the specific row is then activated (e.g., driven to VDD) by the row decoder 191. Given the different VTs of the NFETs 111-112 within the specific twin cell 110, one of the two NFETs 111-112 will switch "ON" before the other such that a read current (Iread) will flow from the pre-charged source line 123 to one of the two bitlines 121-122 before the other, thereby causing a voltage differential between the two bitlines 121-122. The sense amplifier 170 can sense and amplify this voltage differential, outputting an output signal (Q) that is indicative of a stored bit having a logic value of either a "1" or "0".

For example, if VT of NFET 111 is less than VT of NFET 112, NFET 111 will switch ON first and Iread will flow from source line 123 through the NFET 111 to bitline 121, thereby raising the voltage level on bitline 121 relative to the voltage level on bitline 122. In this case, Q will indicate that the stored data value is "1". However, if VT of NFET 111 is greater than VT of NFET 112, NFET 112 will switch ON first and Iread will flow from source line 123 through NFET 112 to bitline 122, thereby raising the voltage level on bitline 122 relative to the voltage level on bitline 121. In this case, Q will indicate that the stored data value is "0". Since each twin cell randomly stores a bit, the randomly stored bits within all the twin cells within the array can be read out in sequence as a unique bitstring. That is, read operations can be performed with respect to each individual twin cell within the array 180 in sequence from the first twin cell in the array 180 at C0 and R0 to the last twin cell in the array at C3 and R127 to generate a unique bitstring. The unique bitstring can be stored in a database and associated with a challenge such that the challenge and the unique bitstring form a challenge-response pair (CRP). Then, whenever the particular challenge is received by the PUF structure 100, the randomly stored bits in the twin cells can be read out in the same sequence (e.g., again from the first twin cell in the array at C0 and R0 to the last twin cell in the array at C3 and R127) to generate and output the unique bitstring (i.e., the valid response).

Such a PUF structure 100 is, however, considered to be a weak PUF structure because it only supports a single challenge-response pair (CRP). That is, the PUF structure 100 is configured to support only one valid challenge and one valid response to that challenge. Some applications, however, require a strong PUF structure that is capable of supporting multiple CRPs. That is, they require a PUF structure that is designed to have multiple valid challenges and corresponding responses to those challenges. Typically, a strong PUF structure will incorporate multiple instances of a weak PUF structure (e.g., such as the PUF structure 100) on the same chip in order to support the large number of CRPs. Thus, a strong PUF structure will typically consume significantly more chip area than a weak PUF structure.

In view of the foregoing, disclosed herein are embodiments of a Physically Unclonable Function (PUF) structure, particularly, a strong twin cell memory-based PUF structure. The PUF structure includes an array of twin cells divided into two portions: one with first columns and one with second columns. Twin cells in each first column are connected to a corresponding pair of first bitlines. Twin cells in each second column are connected to a corresponding pair of second bitlines. A first column decoder is connected to the first bitlines and to a first input of sense amplifier (SA) and a second column decoder is connected to the second bitlines and to a second input of SA. Each read operation to generate a bit is directed to a first twin cell in a first column and a second twin cell in a second column and, during the read operation, signals on only one first bitline of the first column containing the first twin cell and only one second bitline of the second column containing the second twin cell are compared. Thus, different sections of different twin cells, in combination, effectively form a bitcell that is read out during the read operation. By enabling bitcells to be formed using different combinations of different sections of different twin cells, the PUF structure can support multiple challenge-response pairs (CRPs) as opposed to a single CRP.

Figure 2:
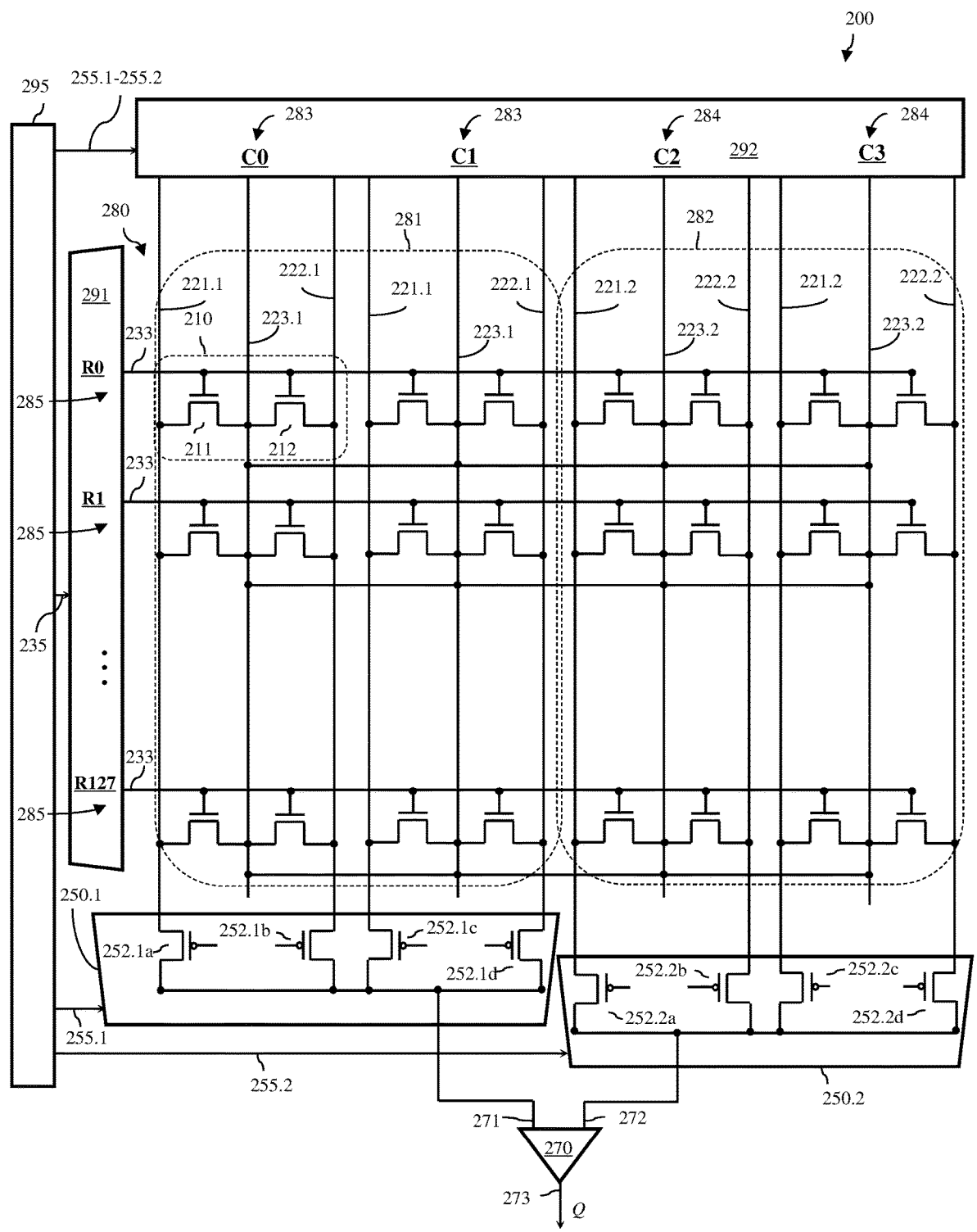
FIG. 2 is a circuit diagram illustrating a disclosed embodiment of a twin cell memory-based PUF.
Figure 3:
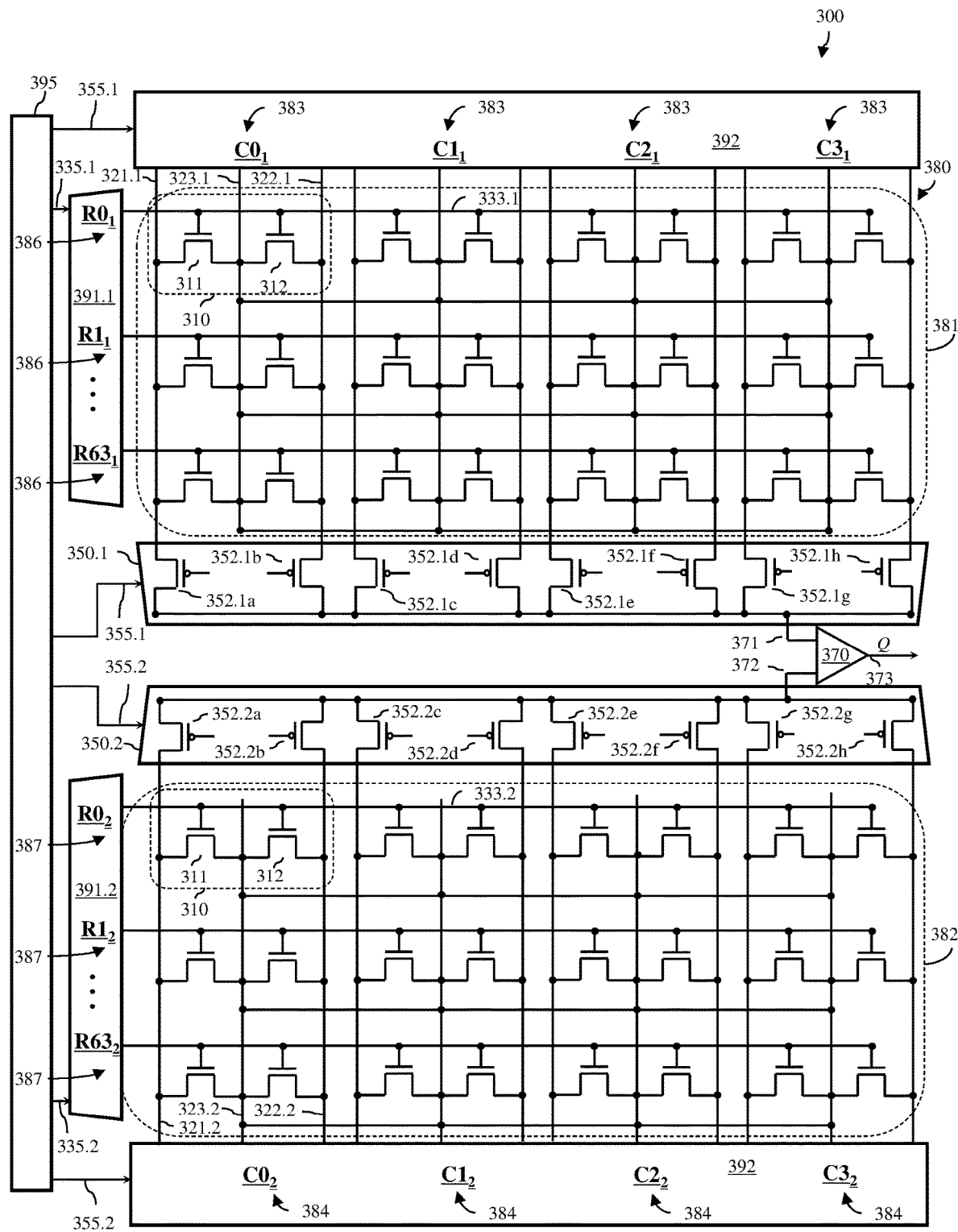
FIG. 3 is a circuit diagram illustrating another disclosed embodiment of a twin cell memory-based PUF.

More specifically, FIG. 2 and FIG. 3 are circuit diagrams illustrating disclosed embodiments of strong twin cell memory-based Physically Unclonable function (PUF) structures 200 and 300, respectively. These PUF structures 200, 300 are considered strong PUF structures because, as discussed in greater detail below, they each support multiple challenge-response pairs (CRPs).

Referring specifically to FIG. 2, the PUF structure 200 can include an array 280 of twin cells 210. A twin cell refers to a memory cell with two sections, which are electrically connected and have the same design (i.e., which are twins). Each twin cell 210 can include, for example, twin field effect transistors (FETs), which are connected in series and which are essentially identical except for random process variations that have occurred naturally during manufacturing. These random process variations can include, but are not limited to, variations in channel length and width, dopant concentration fluctuations in the channel, differences in the amount of charge stored in the gate dielectric, etc. In any case, these random process variations can cause the twin FETs within the twin cells to have different threshold voltages (VTs). For purposes of illustration, the twin cell 210 is described below and illustrated in the drawings as including conventional n-type field effect transistors (NFETs) 211-212. However, it should be understood that the discussion and the drawings are not intended to be limiting and that, alternatively, each twin cell 210 could include FETs of some other suitable type where random process variations similarly lead to different VTs (e.g., p-type field effect transistors (PFETs), charge trap field effect transistors (CTFETs), ferroelectric field effect transistors (FeFETs), floating gate field effect transistors (FGFETs), etc.).

In any case, the array 280 can include two portions: a first portion 281 with first columns 283 and a second portion 282 with second columns 284 positioned laterally adjacent to the first portion 281. The numbers of first columns 283 in the first portion 281 can be equal to the numbers of second columns 284 in the second portion 282. Additionally, all rows 285 in the array can extend laterally across and intersect all first columns 283 in the first portion 281 and all second columns 284 in the second portion 282. Thus, the first portion 281 and the second portion 282 can have the same number of twin cells. That is, the first portion 281 can include one-half of the twin cells 210 within the array 280 and the second portion 282 can include another half of the twin cells 210 within the array 280. For purposes of illustration, the exemplary array 280 shown in FIG. 2 has a total of 512 twin cells arranged in four columns (e.g., C0-C3) and 128 rows (e.g., R0-R127). The first portion 281 includes two first columns 283 (e.g., C0-C1). The second portion 282 is positioned laterally adjacent to the first portion 281 and includes two second columns 284 (e.g., C2-C3). The 128 rows 285 (e.g., R0-R127) extend laterally across and intersect each of the first columns 283 and each of the second columns 284.

The PUF structure 200 can further include a pair of first bitlines 221.1-222.1 and a first source line 223.1 for each first column 283 in the first portion 281 and a pair of second bitlines 221.2-222.2 and a second source line 223.2 for each second column 284 in the second portion 282. All twin cells 210 in each first column 283 can be connected between a corresponding pair of the first bitlines 221.1 and 222.1 for that first column 283. For example, the NFETs 211-212 in each twin cell 210 in each first column 283 can be electrically connected in series between the pair of first bitlines 221.1-222.1 for that first column 283. Additionally, the junction between sections (e.g., between the NFETs 211-212) in each twin cell 210 in each first column 283 can be electrically connected to a corresponding first source line 223.1 for that first column 283. Similarly, all twin cells 210 in each second column 284 can be connected between a corresponding pair of the second bitlines 221.2 and 222.2 for the second column. For example, the NFETs 211-212 in each twin cell 210 in each second column 284 can be electrically connected in series between the pair of second bitlines 221.2-222.2 for that second column 284. Additionally, the junction between sections in each twin cell 210 (e.g., between the NFETs 211-212) in each second column 284 can be electrically connected to a corresponding second source line 223.2 for that second column 284.

The PUF structure 200 can further include wordlines 233 for the rows 285, respectively. All twin cells 210 in each row 285 can be connected to a corresponding wordline 233 for that row 285. For example, the gates of the NFETs 211-212 in each of the twin cells 210 in a given row 285, including twin cells 210 in the first columns 283 and twin cells 210 in the second columns 284, can be connected to a corresponding wordline 233 for that row.

The PUF structure 200 can further include a sense amplifier 270. The sense amplifier 270 can have a first input 271, a second input 272, and an output 273. The sense amplifier 270 can be configured to sense and amplify the voltage differential between signals at the first input 271 and the second input 272 and can output an output signal (Q) at the output 273. Q will be indicative of a randomly stored bit having a logic value of either a "1" or "0", depending upon the voltage differential. See detailed discussion below regarding the read operation.

The PUF structure 200 can further include a controller 295 and, in communication with the controller 295, a pre-charge circuit 292, a row decoder 291, a first column decoder 250.1 and a second column decoder 250.2.

The pre-charge circuit 292 can be electrically connected to the first source lines 223.1 for the first columns 283 and to the second source lines 223.2 for the second columns 284. The pre-charge circuit 292 can be configured to pre-charge first and second source lines in response to control signal(s) from the controller 295 prior to a read operation, as discussed in further detail below. For example, the pre-charge circuit 292 can be configured to pre-charge all source lines in response to a global pre-charge signal from the controller 295. Alternatively, the pre-charge circuit 292 can include column address decode logic and can be configured to pre-charge only one specific first source line for one specific first column and one specific second source line for one specific second column in response to a first column address signal 255.1 and a second column address signal 255.2, respectively.

The first column decoder 250.1 can include column address decode logic and a first multiplexor (MUX), which is connected to each of the first bitlines 221.1, 222.1 for each of the first columns 283, respectively (e.g., to first bitline 221.1 of C0, to first bitline 222.1 of C0, to first bitline 221.1 of C1 and to first bitline 222.1 of C1) and to the first input 271 of the sense amplifier 270. The first column decoder 250.1 can be configured to selectively connect one specific first bitline for one specific first column to the first input 271 of the sense amplifier 270 in response to a specific first column address signal 255.1 received from the controller 295 during a read operation. It should be noted that the specific first column address signal 255.1 should indicate both the specific first column (e.g., C0 or C1) and the specific first bitline for the specific first column (e.g., either the first bitline 221.1 on the left-side of the specific first column or the first bitline 222.1 on the right-side of the specific first column). For example, the first MUX can include first p-type field effect transistors (PFETs) (e.g., see PFETs 252.1a-252.1d) connected between each of the first bitlines for each of the first columns 283 and the first input 271 of the sense amplifier 270, respectively. The first column address signal 255.1 received and decoded by the column decode logic of the first column decoder 250.1 ensures that only the first PFET that is connected between the specific first bitline and the first input switches to an ON state. Thus, the sense amplifier 270 only receives a signal from one specific first bitline of one specific first column at the first input 271.

The second column decoder 250.2 can include column address decode logic and a second MUX, which is connected to each of the second bitlines 221.2, 222.2 for each of the second columns 284, respectively (e.g., to second bitline 221.2 of C2, to second bitline 222.2 of C2, to second bitline 221.2 of C3 and to second bitline 222.2 of C3) and to the second input 272 of the sense amplifier 270. The second column decoder 250.2 can be configured to selectively connect one specific second bitline for one specific second column to the second input 272 of the sense amplifier 270 in response to a specific second column address signal 255.2 received from the controller 295 during a read operation. It should be noted that the specific second column address signal 255.2 should indicate both the specific second column (e.g., C2 or C3) and the specific second bitline (e.g., either the second bitline 221.2 on the left-side of the specific second column or the second bitline 222.2 on the right-side of the specific second column). For example, the second MUX can include second PFETs (e.g., see PFETs 252.2a-252.2d) connected between each of the second bitlines for each of the second columns and the second input 272 of the sense amplifier 270, respectively. The second column address signal 255.2 received and decoded by the column decode logic of the second column decoder 250.2 ensures that only the second PFET that is connected between the specific bitline and the second input switches to an ON state. Thus, the sense amplifier 270 only receives a signal from the specific second bitline at the second input 272.

The row decoder 291 can be electrically connected to the wordlines 233 for the rows 285. The row decoder 291 can include, for example, row address decode logic and drivers. The row decoder 291 can be configured to selectively activate (e.g., drive to VDD) one specific wordline 233 for one specific row 233 in response to a specific row address signal 235 received from the controller 295 during a read operation.

Such a PUF structure 200 can generate a response to a challenge and, more specifically, can, in response to a challenge, perform read operations in a particular sequence so as to output bits in a unique bitstring. However, each read operation is not directed to one individual twin cell (as in prior art PUF structures). Instead, each read operation is directed to two discrete twin cells in the same specific row 285, including one twin cell 210 in a specific one of the first columns 283 and another twin cell 210 in a specific one of the second columns 284. Furthermore, each read operation is only directed to one section of each of the two twin cells.

More specifically, prior to a read operation, the pre-charge circuit 292 can, in response to control signal(s) from the controller 295, pre-charge a first source line 223.1 for a specific first column 283 and a second source line 223.2 for a specific second column 284. Following pre-charging of the source lines, the read operation can proceed as follows.

The first column decoder 250.1 can selectively connect a specific first bitline for the specific first column 283 to the first input 271 of the sense amplifier 270 in response to a specific first column address signal 255.1 from the controller 295. As mentioned above, the first column address signal 255.1 can indicate both the specific first column (e.g., C0 or C1) and the specific first bitline for that specific first column (e.g., the first bitline 221.1 on the left-side or the first bitline 222.1 on the right-side). Additionally, the second column decoder 250.2 can selectively connect a specific second bitline for the specific second column 284 to the second input 272 of the sense amplifier 270 in response to a specific second column address signal 255.2 from the controller 295. As mentioned above, the second column address signal 255.2 can indicate both the specific second column (e.g., C2 or C3) and the specific second bitline for that specific second column (e.g., the second bitline 221.2 on the left-side or the second bitline 222.2 on the right-side).

Next, the row decoder 291 can, in response to a specific row address signal 235, activate (i.e., drive to VDD) the specific wordline 233 for the specific row 285 that contains the two twin cells, thereby applying VDD to the gates of the NFETs 211-212 of each twin cell in that specific row 285.

Due to random process variations, which occur naturally during manufacturing (e.g., variations in channel length and width, dopant concentration fluctuations in the channel, differences in the amount of charge stored in the gate dielectric, etc.), the FETs within each twin cell and within different twin cells can have different threshold voltages (VTs). Given the different VTs, one of the two FETs that are in the two different twin cells connected to the activated wordline for the row and further connected to the specific first and second bitlines, will switch "ON" before the other such that a read current (Iread) will flow from the pre-charged first source line to the specific first bitline first or from the pre-charged second source line to the specific second bitline first, thereby causing a voltage differential between the specific first bitline that is connected to the first input 271 of the sense amplifier 270 and the specific second bitline that is connected to the second input 272 of the sense amplifier 270. The sense amplifier 270 can sense and amplify this voltage differential, outputting an output signal (Q) that is indicative of a randomly stored bit having a logic value of either a "1" or "0". For example, if VT of the NFET, which is in the specific first column and which is directly connected to the specific first bitline, is less than VT of the NFET, which is in the specific second column and which is directly connected to the specific second bitline, Iread will flow to the specific first bitline first, thereby raising the voltage level on specific first bitline relative to the voltage level on the specific second bitline. In this case, Q may indicate that the stored data value is "1". However, if VT of the NFET, which is in the specific first column and which is directly connected to the specific first bitline, is greater than VT of the NFET, which is in the specific second column and which is directly connected to the specific second bitline, Iread will flow to the specific second bitline first, thereby raising the voltage level on specific second bitline relative to the voltage level on the specific first bitline. In this case, Q may indicate that the stored data value is "0".

Therefore, the PUF structure 200 allows different sections of different twin cells, in combination, to effectively form a bitcell that is read out during the read operation. By enabling bitcells to be formed using different combinations of different sections of different twin cells, the PUF structure 200 supports multiple challenge-response pairs (CRPs) as opposed to a single CRP. Specifically, when a PUF structure 200 is configured as described above such that it includes a first number of columns of twin cells and a second number of rows of twin cells, the PUF structure 200 can support generation of the first number of CRPs with each response of each CRP being a unique bitstring that includes a third number of bits equal to the product of the first number and the second number. For example, when a PUF structure 200 is configured so as to have four columns 283-284 of twin cells and one hundred and twenty-eight rows of twin cells, it can, as discussed in further detail below, generate four different responses for four different CRP with each response being unique bitstring with five hundred and twelve bits. That is, read operations can be performed in any one of four different sequences to generate any one of four unique 512-bit bitstrings, respectively, that can be employed as a response for a CRP.

More specifically, given the PUF structure 200 shown in FIG. 2, a first particular sequence of read operations to generate a first unique 512-bit bitstring for a first CRP can include a first read of R0: C0 (left-side first bitline 221.1) and C2 (left-side second bitline 221.2) through to a last read of R127: C1 (right-side first bitline 222.1) and C2 (left-side second bitline 221.2). A second particular sequence of read operations to generate a second unique 512-bit bitstring for a second CRP can include a first read of R0: C0 (left-side first bitline 221.1) and C2 (right-side second bitline 222.2) through to a last read of R127: C1 (right-side first bitline 222.1) and C2 (right-side second bitline 222.2). A third particular sequence of read operations to generate a third unique 512-bit bitstring for a third CRP can include a first read of R0: C0 (left-side first bitline 221.1) and C3 (left-side second bitline 221.2) through to a last read of R127: C1 (right-side first bitline 222.1) and C3 (left-side second bitline 221.2). Finally, a fourth particular sequence of read operations to generate a fourth unique 512-bit bitstring for a fourth CRP can include a first read of R0: C0 (left-side first bitline 221.1) and C3 (right-side second bitline 222.2) through to a last read of R127: C1 (right-side first bitline 222.1) and C3 (right-side second bitline 222.2).

Alternative PUF structure embodiments disclosed herein have somewhat different configurations to support even more CRPs using the same numbers of twin cells within an array.

For example, referring to specifically to FIG. 3, the PUF structure 300 can include an array 380 of twin cells 310. As discussed above with regard to the PUF structure 200, a twin cell refers to a memory cell with two sections, which are electrically connected and have the same design (i.e., which are twins). Each twin cell 310 can include, for example, twin field effect transistors (FETs), which are connected in series and which are essentially identical except for random process variations that occur naturally during manufacturing. These random process variations can include, but are not limited to, variations in channel length and width, dopant concentration fluctuations in the channel, differences in the amount of charge stored in the gate dielectric, etc. and can cause the twin FETs within the twin cells to have different threshold voltages (VTs). For purposes of illustration, the twin cell 310 is described below and illustrated in the drawings as including conventional n-type field effect transistors (NFETs) 311-312. However, it should be understood that the discussion and the drawings are not intended to be limiting and that, alternatively, each twin cell 310 could include FETs of some other suitable type where random process variations similarly lead to different VTs (e.g., p-type field effect transistors (PFETs), charge trap field effect transistors (CTFETs), ferroelectric field effect transistors (FeFETs), floating gate field effect transistors (FGFETs), etc.).

In any case, the array 380 can include a first portion 381, which includes first rows 386 and first columns 383 of the twin cells 310, and a second portion 382, which includes second rows 387 and second columns 384 of the twin cells 310. The numbers of first rows 386 and columns 383 in the first portion 381 can be equal to the numbers of second rows 387 and columns 384 in the second portion 382, respectively. Thus, the first portion 381 and the second portion 382 can have the same total number of twin cells. That is, the first portion 281 can include one-half of the twin cells 310 within the array 380 and the second portion 382 can include another half of the twin cells 310 within the array 380. For purposes of illustration, the exemplary array 380 shown in FIG. 3 has a total of 512 twin cells. The first portion 381 has 256 twin cells and includes four first columns 383 (e.g., $C0_1$-$C3_1$) and sixty-four first rows 386 (e.g., $R0_1$-$R63_1$). Similarly, the second portion 382 has 256 twin cells and includes four second columns 384 (e.g., $C0_2$-$C3_2$) and sixty-four second rows 387 (e.g., $R0_2$-$R63_2$). Thus, twin cells at the same location within the first portion 381 and the second portion 382 will have equivalent row and column addresses.

The PUF structure 300 can further include a pair of first bitlines 321.1-322.1 and a first source line 323.1 for each first column 383 in the first portion 381 and a pair of second bitlines 321.2-322.2 and a second source line 323.2 for each second column 384 in the second portion 382. All twin cells 310 in each first column 383 can be connected between a corresponding pair of the first bitlines 321.1 and 322.1 for that first column 283. For example, the NFETs 311-312 in each twin cell 310 in each first column 383 can be electrically connected in series between the pair of first bitlines 321.1-322.1 for that first column 383. Additionally, the junction between the NFETs 311-312 in each twin cell 310 in each first column 383 can be electrically connected to a corresponding first source line 323.1 for that first column 383. Similarly, all twin cells 310 in each second column 384 can be connected between a corresponding pair of the second bitlines 321.2 and 322.2 for the second column. That is, the NFETs 311-312 in each twin cell 310 in each second column 384 can be electrically connected in series between the pair of second bitlines 321.2-322.2 for that second column 384. Additionally, the junction between the NFETs 311-312 in each twin cell 310 in each second column 384 can be electrically connected to a corresponding second source line 323.2 for that second column 384.

The PUF structure 300 can further include first wordlines 333.1 for the first rows 386, respectively, in the first portion 381. All twin cells 310 in each first row 386 can be connected to a corresponding first wordline 333.1 for that first row 386. For example, the gates of both of the NFETs 311-312 in each of the twin cells 310 in a given first row 386 can be connected to a corresponding first wordline 333.1 for that first row 386. The PUF structure 300 can also include second wordlines 333.2 for the second rows 387, respectively, in the second portion 382. All twin cells 310 in each second row 387 can be connected to a corresponding second wordline 333.2 for that second row 387. For example, the gates of both of the NFETs 311-312 in each of the twin cells 310 in a given second row 387 can be connected to a corresponding second wordline 333.2 for that second row 387.

The PUF structure 300 can further include a sense amplifier 370. The sense amplifier 370 can have a first input 371, a second input 372, and an output 373. The sense amplifier 370 can be configured to sense and amplify the voltage differential between signals at the first input 371 and the second input 372 and can output an output signal (Q) at the output 373. Q will be indicative of a randomly stored bit having a logic value of either a "1" or "0", depending upon the voltage differential. See the detailed discussion of the read operation below.

The PUF structure 300 can further include a controller 395 and, in communication with the controller 395, pre-charge circuit(s) 392, a first row decoder 391.1, a second row decoder 391.2, a first column decoder 350.1 and a second column decoder 350.2.

The pre-charge circuit(s) 392 can be electrically connected to the first source lines 323.1 for the first columns 383 and the second source lines 323.2 for the second columns 384. The pre-charge circuit(s) 392 can be configured to pre-charge first and second source lines in response control signal(s) from the controller 395 prior to a read operation, as discussed in further detail below. For example, a single pre-charge circuit can be configured to pre-charge all source lines in response to a global pre-charge signal from the controller 395. Alternatively, the pre-charge circuit(s) can include column address decode logic and can be configured to pre-charge only one specific first source line for one specific first column and one specific second source line for one specific second column in response to a first column address signal 355.1 and a second column address signal 355.2, respectively.

The first column decoder 350.1 can include column address decode logic and a first multiplexor (MUX), which is connected to each of the first bitlines 321.1, 322.1 for each of the first columns 383 in the first portion 381 (e.g., to first bitline 321.1 of $C0_1$, to first bitline 322.1 of $C0_1$, to first bitline 321.1 of $C1_1$, to first bitline 322.1 of $C1_1$, and so on) and to the first input 371 of the sense amplifier 370. The first column decoder 350.1 can be configured to selectively connect one specific first bitline for one specific first column to the first input 371 of the sense amplifier 370 in response to a specific first column address signal 355.1 received from the controller 395 during a read operation. It should be noted that the specific first column address signal 355.1 should indicate both the specific first column (e.g., $C0_1$, $C1_1$, and so on) and the specific first bitline for the specific first column (e.g., either the first bitline 321.1 on the left-side of the specific first column or the first bitline 322.1 on the right-side of the specific first column). For example, the first MUX can include first p-type field effect transistors (PFETs) (e.g., see PFETs 352.1a-352.1h) connected between each of the first bitlines for each of the first columns and the first input 371 of the sense amplifier 370, respectively. The first column address signal 355.1 received and decoded by the column decode logic of the first column decoder 350.1 ensures that only the first PFET that is connected between the specific first bitline of the specific first column and the first input switches to an ON state. Thus, the sense amplifier 370 only receives a signal from one specific first bitline at the first input 371.

The second column decoder 350.2 can include column address decode logic and a second MUX, which is connected to each of the second bitlines 321.2, 322.2 for each of the second columns 384 in the second portion 382 (e.g., to second bitline 321.2 of $C0_2$, to second bitline 322.2 of $C0_2$, to second bitline 321.2 of $C1_2$, to second bitline 322.2 of $C1_2$, and so on) and to the second input 372 of the sense amplifier 370. The second column decoder 350.2 can be configured to selectively connect one specific second bitline for one specific second column to the second input 372 of the sense amplifier 370 in response to a specific second column address signal 355.2 received from the controller 395 during a read operation. It should be noted that the specific second column address signal 355.2 should indicate both the specific second column (e.g., $C0_2$, $C1_2$, and so on) and the specific second bitline (e.g., either the second bitline 321.2 on the left-side of the specific second column or the second bitline 322.2 on the right-side of the specific second column). For example, the second MUX can include second PFETs (e.g., see PFETs 352.2a-352.2h) connected between each of the second bitlines for each of the second columns and the second input 372 of the sense amplifier 370, respectively. The second column address signal 355.2 received and decoded by the column decode logic of the second column decoder 350.2 ensures that only the second PFET that is connected between the specific second bitline of the specific second column and the second input switches to an ON state. Thus, the sense amplifier 370 only receives a signal from one specific second bitline at the second input 372.

The first row decoder 391.1 can be electrically connected to the first wordlines 333.1 for the first rows 386. The first row decoder 391.1 can include, for example, row address decode logic and drivers. The first row decoder 391.1 can be configured to selectively activate (e.g., drive to VDD) one or more first wordlines 333.1 for one or more specific first rows 386 in response to one or more specific first row address signals 335.1 received from the controller 395 during a read operation. Similarly, the second row decoder 391.2 can be electrically connected to the second wordlines 333.2 for the second rows 387. The second row decoder 391.2 can include, for example, row address decode logic and drivers. The second row decoder 391.2 can be configured to selectively activate (e.g., drive to VDD) one or more specific second wordlines 333.2 for one or more specific second rows 387 in response to one or more specific second row address signals 335.1 received from the controller 395 during a read operation.

Such a PUF structure 300 can generate a response to a challenge and, more specifically, can, in response to a challenge, perform read operations in a particular sequence so as to output bits in a unique bitstring. However, each read operation is not directed to one individual twin cell (as in prior art PUF structures). Instead, each read operation is directed to at least two discrete twin cells including one or more twin cells 310 in a specific first columns 383 in the first portion 381 of the array and one or more twin cells 310 in a specific second column 384 in the second portion 382 of the array, where the specific first column and the specific second column have equivalent column addresses (e.g., $C0_1$ and $C0_2$, $C1_1$ and $C1_2$, and so on). Furthermore, each read operation is only directed to the same section of the twin cells. That is, the specific first and second bitlines that will be selectively connected to the first and second inputs of the sense amplifier 370 during a read operation will be from the same side (i.e., left-side or right-side) of the specific first and second columns, which as mentioned above have equivalent column addresses.

More specifically, prior to a read operation, the pre-charge circuit(s) 392 can, in response to control signal(s) from the controller 395, pre-charge a first source line 323.1 for a specific first column 383 and a second source line 323.2 for a specific second column 384. As mentioned above, the specific first column and the specific second column will have equivalent column addresses (e.g., $C0_1$ and $C0_2$, $C1_1$ and $C1_2$, and so on) in the first and second portions 381-382 of the array 380. Following pre-charging of the source lines, the read operation can proceed as follows.

The first column decoder 350.1 can selectively connect a specific first bitline for the specific first column 383 of twin cells 310 in the first portion 381 of the array 380 to the first input 371 of the sense amplifier 370 in response to a specific first column address signal 355.1 from the controller 395. Similarly, the second column decoder 350.2 can selectively connect a specific second bitline for the specific second column 384 in the second portion 382 of the array 380 to the second input 372 of the sense amplifier 370 in response to a specific second column address signal 355.2 from the controller 395. It should be noted that in this PUF structure 300, the first column address signal 355.1 can indicate both the specific first column (e.g., $C0_1$, $C1_1$, etc.) and the specific first bitline for that specific first column (e.g., the first bitline 321.1 on the left-side of the specific first column or the first bitline 322.1 on the right-side of the specific first column). Similarly, the second column address signal 355.2 can indicate both the specific second column (e.g., $C0_2$, $C1_2$, etc.) and the specific second bitline for that specific second column (e.g., the second bitline 221.2 on the left-side or the second bitline 222.2 on the right-side). As mentioned above, during operation of this PUF structure 300, the second column address signal 355.2 will specifically be equivalent to the first specific column address (e.g., $C0_2$ if the first column address is $C0_1$, $C1_2$ if the first column address is $C1_1$, and so on) and the specific second bitline will be on the same side (i.e., left-side or right-side) of the column as the first specific bitline.

Next, the first row decoder 391.1 can, in response to one or more specific first row address signals 335.1, activate (i.e., drive to VDD) one or more specific first wordlines 333.1 for one or more specific first rows 386 in the first portion 381 of the array 380, thereby applying VDD to the gates of the NFETs 311-312 of each of the twin cells in the specific first row(s) 386. Simultaneously, the second row decoder 391.2 can, in response to one or more specific second row address signals 335.2, activate (i.e., drive to VDD) one or more specific second wordlines 333.2 for one or more specific second rows 387 of the twin cells in the second portion 382 of the array 380, thereby applying VDD to the gates of the NFETs 311-312 of each of the twin cells in the specific first row(s) 386. Due to random process variations that occur naturally during manufacturing (e.g., variations in channel length and width, dopant concentration fluctuations in the channel, differences in the amount of charge stored in the gate dielectric, etc.), the FETs within each twin cell and within different twin cells can have different threshold voltages (VTs). Given the different VTs, the voltage level on the specific first bitline may go high before the voltage level on the specific second bitline or vice versa, thereby causing a voltage differential between the specific first bitline connected to the first input 371 of the sense amplifier 370 and the specific second bitline connected to the second input 372 of the sense amplifier 370. The sense amplifier 370 can sense and amplify this voltage differential and output an output signal (Q) at output 373, where Q is indicative of a randomly stored bit having a logic value of either a "1" or "0". For example, if during the read operation, the voltage level on the specific first bitline is greater than the voltage level on the specific second bitline, Q may indicate that the stored data value is "1". However, if during the read operation, the voltage level on the specific second bitline is greater than the voltage level on the specific first bitline, Q may indicate that the stored data value is "0".

Therefore, the PUF structure 300 allows different sections of different twin cells, in combination, to effectively form a bitcell that is read out during the read operation. As in the PUF structure 200, by enabling bitcells to be formed using different combinations of different sections of different twin cells, the PUF structure 300 supports multiple challenge-response pairs (CRPs) as opposed to a single CRP. Furthermore, the PUF structure 300 supports more CRPs than the PUF structure 200. Specifically, when a PUF structure 300 is configured as described above (e.g., with first and second portions of the array each having a first number of bitlines and a second number of wordlines) and when each read operation is directed to one twin cell in the first portion 381 and one twin cell in the second portion 382, the PUF structure 300 can support generation of the second number of CRPs with each CRP being a unique bitstring including a third number of bits equal to the product of the first number and the second number. For example, when a PUF structure 300 is configured as shown in FIG. 3 with first and second portions 381-382 where each portion 381-382 has four columns with four corresponding pairs of bitlines (i.e., eight bitlines) and further has sixty-four rows with sixty-four corresponding wordlines and when each read operation is directed to one twin cell in the first portion 381 and one twin cell in the second portion 382, then the PUF structure 300 can support generation of sixty-four CRPs with each response of each CRP being a unique bitstring with five hundred and twelve bits. That is, read operations can be performed in any one of sixty-four different unique sequences to generate a corresponding one of sixty-four different unique 512-bit bitstrings.

For example, a first particular sequence of read operations to generate a first unique bitstring for a first CRP can include a first read of $R0_1$: $C0_1$ (left-side first bitline 321.1) and $R0_2$: $C0_2$ (left-side second bitline 321.2) through to a last read of $R63_1$: $C4_1$ (right-side first bitline 322.1) and $R0_2$: $C4_1$ (right-side second bitline 322.2). A second particular sequence of read operations to generate a second unique bitstring for a second CRP can include a first read of $R0_1$: $C0_1$ (left-side first bitline 321.1) and $R1_2$: $C0_2$ (left-side second bitline 321.2) through to a last read of $R63_1$: $C4_1$ (right-side first bitline 322.1) and $R1_2$: $C4_2$ (right-side second bitline 322.2). A third particular sequence of read operations to generate a third unique bitstring for a third CRP can include a first read of $R0_1$: $C0_1$ (left-side first bitline 321.1) and $R2_2$: $C0_2$ (left-side second bitline 321.2) through to a last read of $R63_1$: $C4_1$ (right-side first bitline 322.1) and $R2_2$: $C4_2$ (right-side second bitline 322.2) and so on. Finally, a sixty-fourth particular sequence of read operations to generate a sixty-fourth unique bitstring for a sixty-fourth CRP can include a first read of $R0_1$: $C0_1$ (left-side first bitline 321.1) and R63$_2$: C0$_2$ (left-side second bitline 321.2) through to a last read of R63$_1$: C4$_1$ (right-side first bitline 322.1) and R63$_2$: C4$_2$ (right-side second bitline 322.2).

Alternatively, this same exemplary PUF structure 300 can support generation of an exponentially greater number of CRPs with each response of each CRP being a unique bitstring with some lesser number of bits when each read operation is directed to two or more twin cells, which are in different first rows and connected to the same specific first bitline of the specific first column in the first portion, and two or more twin cells, which are in different second rows and connected to the same specific second bitline of the specific second column in the second portion. For example, if each read operation is directed to two twin cells, which are in two different first rows and connected to the same specific first bitline of the same specific first column in the first portion, and to two twin cells, which are in two different second rows and connected to the same specific second bitline of the specific second column in the second portion, generation of 4096 unique 256-bit bitstrings for 4096 CRPs could be supported.

Also disclosed herein are method embodiments associated with operation of the above-described twin cell memory-based Physically Unclonable function (PUF) structures 200 of FIG. 2 and 300 of FIG. 3.

Figure 4:
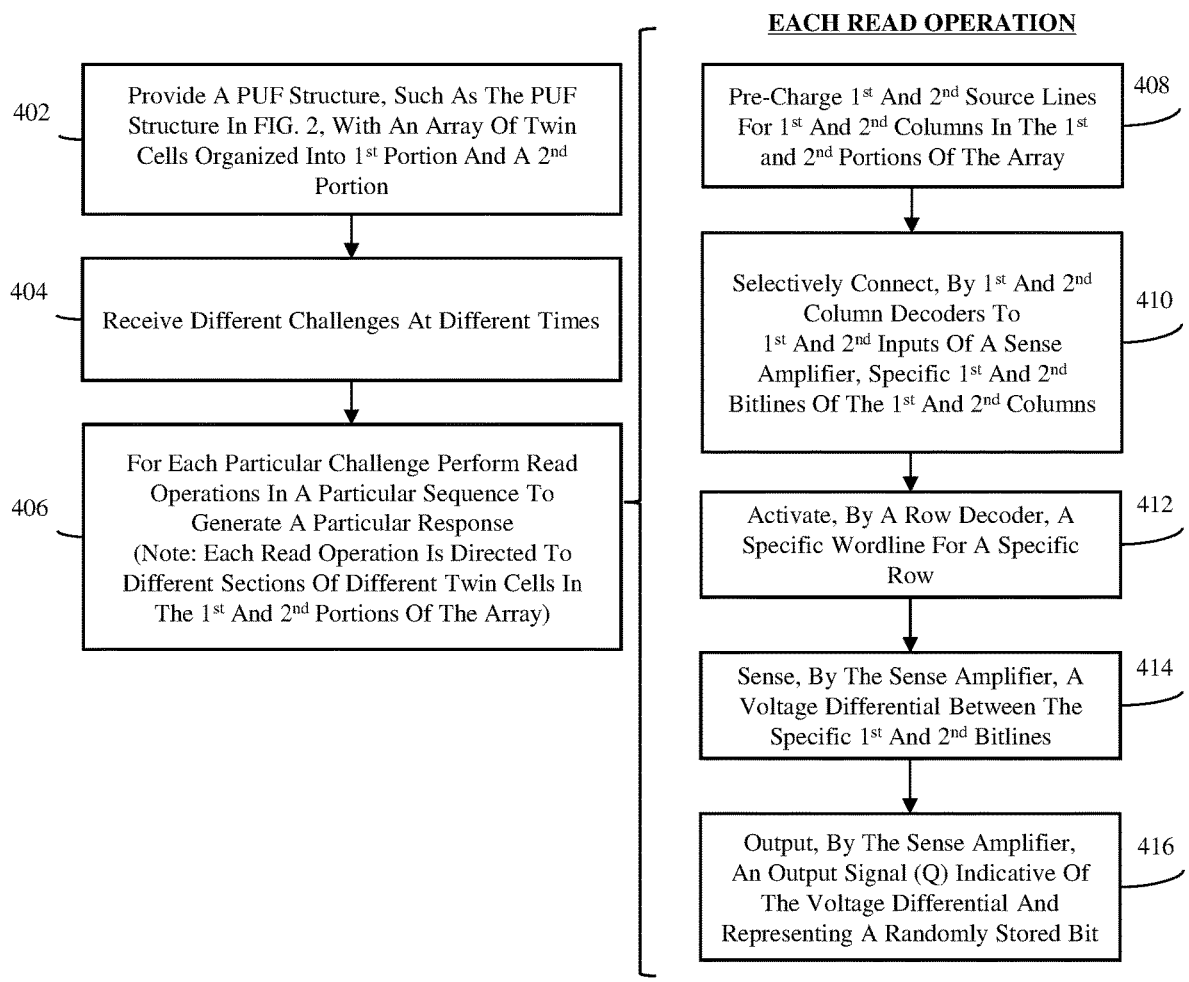
FIG. 4 is a flow diagram illustrating an embodiment of a method of operating the PUF of FIG. 2.

Referring to the flow diagram of FIG. 4 in conjunction with the PUF structure 200 shown in FIG. 2, a method can include providing a twin cell memory-based Physically Unclonable function (PUF) structure, such as the PUF structure 200 described in detail above (see process step 402). The method can further include receiving, by the controller 295, various different challenges at various different times (see process step 404). The method can further include in response to each particular challenge causing, by the controller 295, read operations to be performed in a particular sequence so as to output bits in a unique bitstring, which has been associated with the particular challenge and which has been stored within the particular challenge in a database as a particular challenge-response pair (CRP) (see process step 406). However, each read operation is not directed to one individual twin cell (as in prior art methods). Instead, each read operation is directed to two discrete twin cells in the same specific row 285, including one twin cell 210 in a specific one of the first columns 283 and another twin cell 210 in a specific one of the second columns 284. Furthermore, each read operation is only directed to one section of each of the two twin cells (see process steps 408-416).

More specifically, in the method, prior to a read operation, a first source line 223.1 for a specific first column 283 and a second source line 223.2 for a specific second column 284 can be pre-charged (e.g., by the pre-charge circuit 292 in response to control signal(s) from the controller 295) (see process step 408). Each read operation can then proceed as follows. A specific first bitline for the specific first column 283 can be selectively connected to the first input 271 of the sense amplifier 270 (e.g., by a first column decoder 250.1 in response to a specific first column address signal 255.1 from the controller 295) (see process step 410). A specific second bitline for the specific second column 284 can be selectively connected to the second input 272 of the sense amplifier 270 (e.g., by a second column decoder 250.2 in response to a specific second column address signal 255.2 from the controller 295) (see also process step 410). It should be noted that, in this method, the first column address signal 255.1 can indicate both the specific first column (e.g., C0 or C1) and the specific first bitline for that specific first column (e.g., the first bitline 221.1 on the left-side of the specific first column or the first bitline 222.1 on the right-side of the specific first column) and the second column address signal 255.2 can indicate both the specific second column (e.g., C2 or C3) and the specific second bitline for that specific second column (e.g., the second bitline 221.2 on the left-side of the specific second column or the second bitline 222.2 on the right-side of the specific second column).

Next, the specific wordline 233 for the specific row 285 that contains the two twin cells can be activated (e.g., driven to VDD by the row decoder 291 in response to a row address signal received from the controller 295) (see process step 412). Due to activation of the specific WL 233, VDD is applied to the gates of the NFETs 211-212 of each twin cell in that specific row 285. Due to random process variations that occurred naturally during manufacturing (e.g., variations in channel length and width, dopant concentration fluctuations in the channel, differences in the amount of charge stored in the gate dielectric, etc.), the FETs within each twin cell and within different twin cells can have different threshold voltages (VTs). Given the different VTs, one of the two FETs that are in the two different twin cells connected to the activated wordline for the row and further connected to the specific first and second bitlines, will switch "ON" before the other at process step 412 such that a read current (Iread) will flow from the pre-charged first source line to the specific first bitline first or from the pre-charged second source line to the specific second bitline first, thereby causing a voltage differential between the specific first bitline connected to the first input 271 of the sense amplifier 270 and the specific second bitline connected to the second input 272 of the sense amplifier 270.

This voltage differential between the first specific bitline and the second specific bitline can be sensed and amplified by the sense amplifier 270 (see process step 414) and, given this voltage differential, an output signal (Q), which is indicative of a randomly stored bit having a logic value of either a "1" or "0", can be output by the sense amplifier 270 at output 273 (see process step 416). For example, if VT of the NFET, which is in the specific first column and which directly connected to the specific first bitline, is less than VT of the NFET, which is in the specific second column and which is directly connected to the specific second bitline, Iread will flow to the specific first bitline first, thereby raising the voltage level on the specific first bitline relative to the voltage level on the specific second bitline. In this case, Q may indicate that the stored data value is "1". However, if VT of the NFET, which is in the specific first column and which is directly connected to the specific first bitline, is greater than VT of the NFET, which is in the specific second column and which is directly connected to the specific second bitline, Iread will flow to the specific second bitline first, thereby raising the voltage level on the specific second bitline relative to the voltage level on the specific first bitline. In this case, Q may indicate that the stored data value is "0". Thus, different sections of different twin cells, in combination, effectively form a bitcell that is read out during the read operation.

Figure 5:
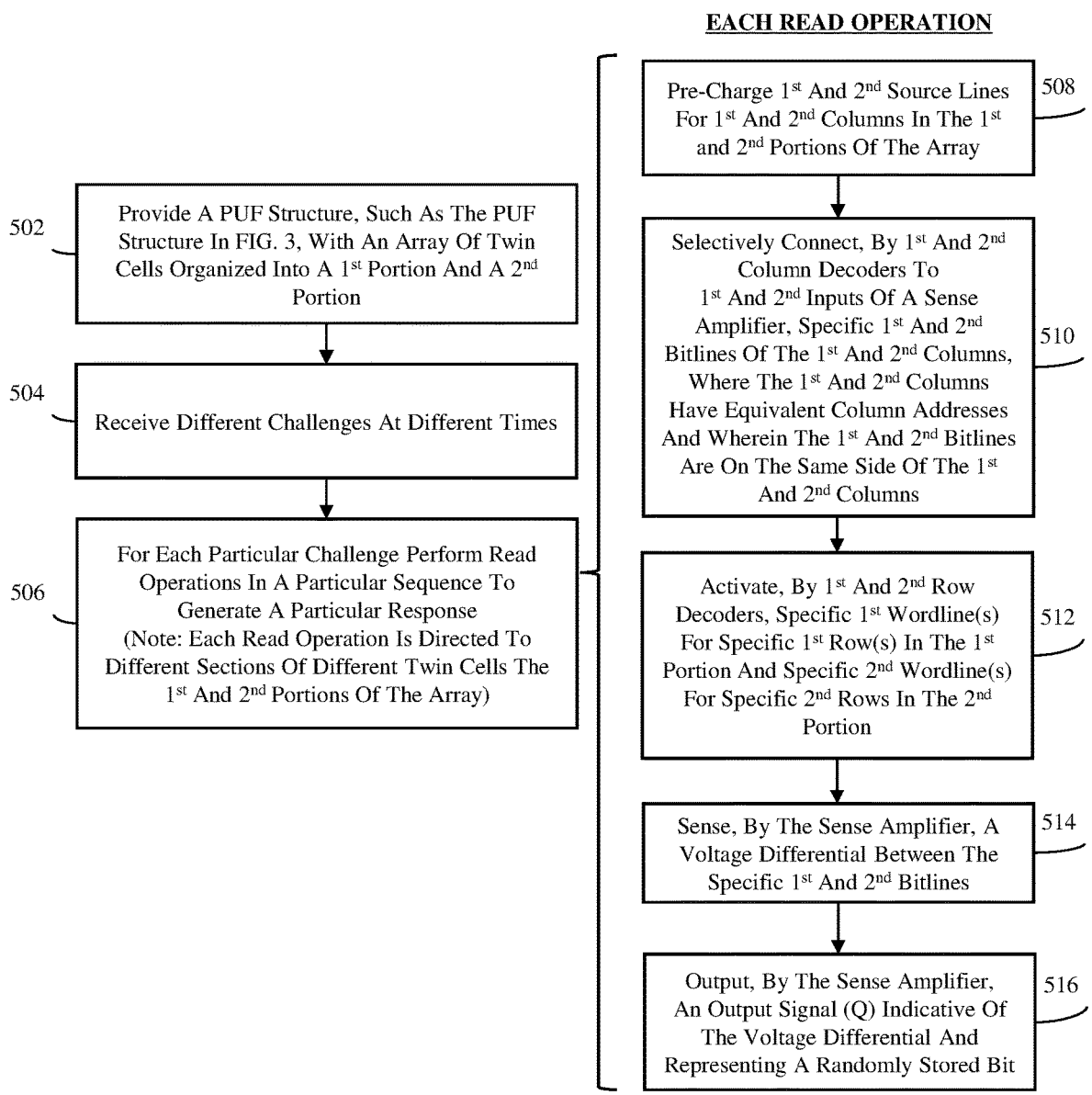
FIG. 5 is a flow diagram illustrating an embodiment of a method of operating the PUF of FIG. 3.

Referring to the flow diagram of FIG. 5 in conjunction with the PUF structure 300 shown in FIG. 3, a method can include providing a twin cell memory-based Physically Unclonable function (PUF) structure, such as the PUF structure 300 described in detail above (see process step 502). The method can further include receiving, by the controller 395, various different challenges at various different times (see process step 504). The method can further include in response to each particular challenge causing, by the controller 395, read operations to be performed in a particular sequence so as to output bits in a unique bitstring, which has been associated with the particular challenge and which has been stored within the particular challenge in a database as a particular challenge-response pair (CRP) (see process step 506). However, each read operation is not directed to one individual twin cell (as in prior art methods). Instead, each read operation is directed to at least two discrete twin cells including one or more twin cells 310 in a specific first columns 383 in the first portion 381 of the array and one or more twin cell 310 in a specific second column 384 in the second portion 382 of the array, where the specific first column and the specific second column have equivalent column addresses (e.g., $C0_1$ and $C0_2$, $C1_1$ and $C1_2$, and so on). Furthermore, each read operation is only directed to the same section of the twin cells. That is, the specific first and second bitlines that will be selectively connected to the first and second inputs of the sense amplifier 370 at process step 510, discussed below, will be from the same side of the specific first and second columns.

More specifically, in the method, prior to a read operation, a first source line 323.1 for a specific first column 383 and a second source line 323.2 for a specific second column 384 can be pre-charged (e.g., by the pre-charge circuit(s) 392 in response to control signal(s) from the controller 395) (see process step 508). Each read operation can then proceed as follows. A specific first bitline for the specific first column 383 of twin cells 310 in the first portion 381 of the array 380 can be selectively connected (e.g., by the first column decoder 350.1) to the first input 371 of the sense amplifier 370 (e.g., by the first column decoder 350.1 in response to a specific first column address signal 355.1 from the controller 395) (see process step 510). Additionally, a specific second bitline for the specific second column 384 in the second portion 382 of the array 380 can be selectively connected to the second input 372 of the sense amplifier 370 (e.g., by the second column decoder 350.2 in response to a specific second column address signal 355.2 from the controller 395) (see also process step 510). It should be noted that, in this method, the first column address signal 355.1 can indicate both the specific first column (e.g., $C0_1$, $C1_1$, etc.) and the specific first bitline for that specific first column (e.g., the first bitline 321.1 on the left-side or the first bitline 322.1 on the right-side) and the second column address signal 355.2 can indicate both the specific second column (e.g., $C0_2$, $C1_2$, etc.) and the specific second bitline for that specific second column (e.g., the second bitline 221.2 on the left-side or the second bitline 222.2 on the right-side). Additionally, the second column address signal 355.2 will specifically be equivalent to the first specific column address 355.1 (e.g., $C0_2$ if the first column address is $C0_1$, $C1_2$ if the first column address is $C1_1$, and so on) and the specific second bitline will be on the same side (i.e., left or right) of the column as the first specific bitline.

Next, one or more specific first wordlines 333.1 for one or more specific first rows 386 in the first portion 381 of the array 380 can be selectively activated (e.g., driven to VDD) (e.g., by the first row decoder 391.1 in response to one or more specific first row address signals 335.1) (see process step 512). Due to activation of the specific first wordline(s), VDD is applied to the gates of the NFETs 311-312 of each of the twin cells in each of the specific first row(s) 386. Essentially simultaneously one or more specific second wordlines 333.2 for one or more specific second rows 387 of the twin cells in the second portion 382 of the array 380 can be selectively activated (e.g., driven to VDD) (e.g., by the second row decoder 391.2 in response to one or more specific second row address signals 335.2) (see also process step 512). Due to activation of the specific second wordline(s), VDD is also applied to the gates of the NFETs 311-312 in each of the twin cells in the specific first row(s) 386. Due to random process variations, which occur naturally during manufacturing (e.g., variations in channel length and width, dopant concentration fluctuations in the channel, differences in the amount of charge stored in the gate dielectric, etc.), the FETs within each twin cell and within different twin cells can have different threshold voltages (VTs). Given the different VTs, the voltage level on the specific first bitline connected to the first input 371 of the sense amplifier 370 may go high at process step 512 before the voltage level on the specific second bitline or vice versa, thereby causing a voltage differential between the specific first bitline and the specific second bitline.

The voltage differential between the first specific bitline and the second specific bitline can be sensed and amplified (e.g., by the sense amplifier 370) (see process step 514) and, given this voltage differential, an output signal (Q), which is indicative of a randomly stored bit having a logic value of either a "1" or "0", can be output by the sense amplifier 370 (see process step 516). For example, if during the read operation, the voltage level on the specific first bitline is raised relative to the voltage level on the specific second bitline, Q may indicate that the stored data value is "1". However, if during the read operation, the voltage level on the specific second bitline is raised relative to the voltage level on the specific first bitline, Q may indicate that the stored data value is "0".

In each of the above-described methods, different sections of different twin cells, in combination, effectively form a bitcell that is read out during the read operation. By enabling such bitcells to be formed using different combinations of different sections of different twin cells, the methods use a single array to support multiple challenge-response pairs (CRPs) as opposed to a single CRP.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or sections thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
an array of twin cells, wherein the array has first columns of the twin cells and second columns of the twin cells and wherein each twin cell comprises a pair of field effect transistors;
first bitlines for the first columns, wherein all twin cells in each first column are connected between a corresponding pair of the first bitlines for the first column;
second bitlines for the second columns, wherein all twin cells in each second column are connected between a corresponding pair of the second bitlines for the second column;
a sense amplifier having a first input and a second input;
a first column decoder connected to each of the first bitlines for each of the first columns and to the first input, wherein the first column decoder is configured to connect any one of the first bitlines to the first input; and
a second column decoder connected to each of the second bitlines for each of the second columns and to the second input, wherein the second column decoder is configured to connect any one of the second bitlines to the second input,
wherein the sense amplifier senses a voltage differential between the one of the first bitlines at the first input and the one of the second bitlines at the second input,
wherein the voltage differential is due to random process variation-induced threshold voltage differences between two different field effect transistors within two different selected twin cells, respectively, and,
wherein one of the two different field effect transistors is connected to the one of the first bitlines at the first input and another of the two different field effect transistors is connected to the one of the second bitlines at the second input.

2. The structure of claim 1,
wherein each twin cell comprises two n-type field effect transistors, and
wherein the two n-type field effect transistors are connected in series between a pair of bitlines for a column, have a junction connected to a source line for the column, and have gates connected to a wordline for a row.

3. The structure of claim 1,
wherein the first columns are in a first portion of the array,
wherein the second columns are in a second portion of the array that is positioned laterally adjacent to the first portion, and
wherein the array further has rows that extend across the first portion and the second portion such that each row intersects each of the first columns in the first portion and each of the second columns in the second portion.

4. The structure of claim 3, further comprising:
wordlines for the rows, wherein all cells in each row are connected to a corresponding wordline for the row;
first source lines for the first columns, wherein all cells in each first column are connected to a corresponding first source line for the first column;
second source lines for the second columns, wherein all cells in each second column are connected to a corresponding second source line for the first column;
a row decoder connected to the wordlines;
a pre-charge circuit connected to the first source lines and the second source lines; and
a controller in communication with the first column decoder, the second column decoder, the row decoder, and the pre-charge circuit,
wherein, in response to control signals from the controller to initiate a read operation, the pre-charge circuit pre-charges a first source line for a specific first column and a second source line for a specific second column, the row decoder activates a wordline for a specific row, the first column decoder connects a specific first bitline for the specific first column to the first input of the sense amplifier, the second column decoder connects a specific second bitline for the specific second column to the second input of the sense amplifier, and the sense amplifier senses the voltage differential between the specific first bitline and the specific second bitline.

5. The structure of claim 1, wherein the voltage differential is indicative of a randomly stored bit.

6. The structure of claim 4,
wherein the first column decoder comprises first p-type field effect transistors connected between the first bitlines and the first input of the sense amplifier, respectively,
wherein a first column address signal ensures that only a first p-type field effect transistor connected between the specific first bitline and the first input switches to an ON state,
wherein the second column decoder comprises second p-type field effect transistors connected between the second bitlines and the second input of the sense amplifier, respectively, and
wherein a second column address signal ensures that only a second p-type field effect transistor connected between the specific second bitline and the second input switches to the ON state.

7. The structure of claim 1,
wherein the array has a first number of columns and a second number of rows, and
wherein the structure supports generation of the first number of challenge-response pairs with each challenge-response pair comprising a unique bitstring having a third number of bits equal to a product of the first number and the second number.

8. The structure of claim 1,
wherein the array has four columns of the twin cells and one hundred and twenty-eight rows of the twin cells, and wherein the structure supports generation of four challenge-response pairs with each response of each challenge-response pair comprising a unique bitstring with five hundred and twelve bits.

9. A structure comprising:
an array of twin cells, wherein each twin cell comprises a pair of n-type field effect transistors connected in series and wherein the array has first columns of the twin cells and second columns of the twin cells;
first bitlines for the first columns, wherein all cells in each first column are connected between a corresponding pair of the first bitlines for the first column;
second bitlines for the second columns, wherein all cells in each second column are connected between a corresponding pair of the second bitlines for the second column;
a sense amplifier having a first input and a second input;
a first column decoder connected to each of the first bitlines for each of the first columns and to the first input, wherein the first column decoder is configured to connect any one of the first bitlines to the first input; and
a second column decoder connected to each of the second bitlines for each of the second columns and to the second input, wherein the second column decoder is configured to connect any one of the second bitlines to the second input,
wherein the sense amplifier senses a voltage differential between the one of the first bitlines at the first input and the one of the second bitlines at the second input,
wherein the voltage differential is due to random process variation-induced threshold voltage differences between two different field effect transistors within two different selected twin cells, respectively, and,
wherein one of the two different field effect transistors is connected to the one of the first bitlines at the first input and another of the two different field effect transistors is connected to the one of the second bitlines at the second input.

10. The structure of claim 9,
wherein the array has a first portion and a second portion,
wherein the first portion has first rows of the twin cells and the first columns and the second portion has second rows of the twin cells and the second columns,
wherein the structure further comprises:
first wordlines for the first rows, wherein all cells in each first row are connected to a corresponding first wordline for the first row;
first source lines for the first columns, wherein all cells in each first column are connected to a corresponding first source line for the first column;
second wordlines for the second rows, wherein all cells in each second row are connected to a corresponding second wordline;
second source lines for the second columns, wherein all cells in each second column are connected to a corresponding second source line;
a first row decoder connected to the first wordlines;
a second row decoder connected to the second wordlines;
a pre-charge circuit connected to the first source lines and the second source lines; and
a controller in communication with the first column decoder, the second column decoder, the first row decoder, the second row decoder and the pre-charge circuit.

11. The structure of claim 10, wherein, in response to control signals from the controller to initiate a read operation, the pre-charge circuit pre-charges a first source line for a specific first column and a second source line for a specific second column having an equivalent column address as the specific first column, the first row decoder activates a first wordline for a specific first row, the second row decoder activates a second wordline for a specific second row, the first column decoder connects a specific first bitline for the specific first column to the first input of the sense amplifier, the second column decoder connects a specific second bitline for the specific second column to the second input of the sense amplifier, and the sense amplifier sense a voltage differential between the specific first bitline and the specific second bitline.

12. The structure of claim 9, wherein the voltage differential is indicative of a randomly stored bit.

13. The structure of claim 11,
wherein the first column decoder comprises first p-type field effect transistors connected between the first bitlines and the first input of the sense amplifier, respectively,
wherein a first column address signal ensures that only a first p-type field effect transistor connected between the specific first bitline and the first input switches to an ON state,
wherein the second column decoder comprises second p-type field effect transistors connected between the second bitlines and the second input of the sense amplifier, respectively, and
wherein a second column address signal ensures that only a second p-type field effect transistor connected between the specific second bitline and the second input switches to the ON state.

14. The structure of claim 11,
wherein the first portion and the second portion each have a first number of bitlines and a second number of wordlines, and
wherein the structure supports generation of the second number of challenge-response pairs with each challenge-response pair comprising a unique bitstring with a third number of bits equal to a product of the first number and the second number.

15. The structure of claim 11,
wherein the first portion and the second portion each have eight bitlines and sixty-four wordlines, and
wherein the structure supports generation of sixty-four challenge-response pairs with each challenge-response pair comprising a unique bitstring with five hundred and twelve bits.

16. The structure of claim 10, wherein, in response to control signals from the controller to initiate a read operation, the pre-charge circuit pre-charges a first source line for a specific first column and a second source line for a specific second column having an equivalent column address as the specific first column, the first row decoder activates multiple first wordlines for multiple first rows, the second row decoder activates multiple second wordlines for multiple second rows, the first column decoder connects a specific first bitline for the specific first column to the first input of the sense amplifier, the second column decoder connects a specific second bitline for the specific second column to the second input of the sense amplifier, and the sense amplifier senses a voltage differential on the specific first bitline and the specific second bitline.

17. A method comprising:
  providing a structure comprising:
    an array of twin cells, wherein the array has first columns of the twin cells and second columns of the twin cells and wherein each twin cell comprises a pair of field effect transistors;
    first bitlines for the first columns, wherein all cells in each first column are connected between a corresponding pair of the first bitlines for the first column;
    second bitlines for the second columns, wherein all cells in each second column are connected between a corresponding pair of the second bitlines for the second column;
    a sense amplifier having a first input and a second input;
    a first column decoder connected to each of the first bitlines for each of the first columns and to the first input, wherein the first column decoder is configured to connect any one of the first bitlines to the first input; and
    a second column decoder connected to each of the second bitlines for each of the second columns and to the second input, wherein the second column decoder is configured to connect any one of the second bitlines to the second input;
  receiving, by the structure, a challenge; and
  generating, by the structure, a response to the challenge, wherein the generating of the response comprises performing read operations in a particular sequence to output bits in a unique bitstring, wherein each read operation is associated with at least two different twin cells, wherein the at least two different twin cells comprise at least one twin cell in a specific first column and at least one twin cell in a specific second column, and wherein each read operation comprises:
    connecting, by the first column decoder, a specific first bitline for the specific first column to the first input of the sense amplifier;
    connecting, by the second column decoder, a specific second bitline for the specific second column to the second input of the sense amplifier; and
    sensing, by the sense amplifier, a voltage differential between the specific first bitline and the specific second bitline,
  wherein the voltage differential is due to random process variation-induced threshold voltage differences between two different field effect transistors within two different selected twin cells, respectively,
  wherein one of the two different field effect transistors is connected to the specific first bitline and another of the two different field effect transistors is connected to the specific second bitline, and
  wherein the voltage differential is indicative of a randomly stored bit.

18. The method of claim 17,
  wherein the array further has rows of the twin cells,
  wherein the first columns are in a first portion of the array and the second columns are in a second portion of the array that is positioned laterally adjacent to the first portion such that each row intersects each of the first columns and each of the second columns, and
  wherein the two different twin cells are in a same row.

19. The method of claim 17,
  wherein the array further has a first portion and a second portion,
  wherein the first portion has first rows of the twin cells and the first columns,
  wherein the second portion has second rows of the twin cells and the second columns, and
  wherein the two different twin cells are at equivalent column addresses within the first portion and the second portion.

20. The method of claim 17,
  receiving, by the structure, multiple different challenges; and
  generating, by the structure, multiple different responses to the multiple different challenges, respectively.

* * * * *